United States Patent
Kawata

(10) Patent No.: US 6,769,070 B1
(45) Date of Patent: *Jul. 27, 2004

(54) STANDBY CIRCUIT FOR DIGITAL DISPLAY MONITOR

(75) Inventor: Toshiro Kawata, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 580 days.

This patent is subject to a terminal disclaimer.

(21) Appl. No.: 09/745,749

(22) Filed: Dec. 22, 2000

Related U.S. Application Data

(63) Continuation-in-part of application No. 09/658,657, filed on Sep. 8, 2000.

(51) Int. Cl.[7] .............................. G06F 1/26; G06F 1/32
(52) U.S. Cl. ...................... 713/324; 713/300; 713/310; 713/320; 713/322; 713/323; 345/211; 345/212
(58) Field of Search ................................ 713/300, 320, 713/322, 323, 324, 310; 307/125; 345/211, 212

(56) References Cited

U.S. PATENT DOCUMENTS

| | | | | |
|---|---|---|---|---|
| 5,389,952 A | * | 2/1995 | Kikinis ........................ 345/212 |
| 5,664,203 A | * | 9/1997 | Hong et al. .................. 713/323 |
| 5,736,873 A | * | 4/1998 | Hwang ......................... 327/41 |
| 5,745,105 A | * | 4/1998 | Kim ............................ 345/212 |
| 5,944,830 A | * | 8/1999 | Hong et al. .................. 713/324 |
| 6,191,504 B1 | * | 2/2001 | Kawata ....................... 307/125 |
| 6,362,541 B1 | * | 3/2002 | Kawata ....................... 307/125 |

FOREIGN PATENT DOCUMENTS

JP          10224289 A  *  8/1998  ............ H04B/7/26

OTHER PUBLICATIONS

Dubois, Y.A.; Farrell, J.J., III; "ASIC design considerations for power management in laptop computers", Euro ASIC '91, May 27–31, 1991, page(s): 348–351.*

* cited by examiner

Primary Examiner—Thomas Lee
Assistant Examiner—James K. Trujillo
(74) Attorney, Agent, or Firm—Wagner, Murabito & Hao LLP

(57) ABSTRACT

A system and method for reducing power consumption in a digital display device in standby mode. The display device receives a voltage from a secondary power source in main mode but not in standby mode. An opto-coupler detects the voltage from the secondary power source. An integrated circuit that controls power to the display device is powered on in response to the opto-coupler detecting the voltage, and is otherwise powered off. The display device switches to main mode when the secondary power source is detected and to the standby mode when it is not. With use of the opto-coupler, it is not necessary for components of the display device to remain powered on in standby mode in order to detect the secondary power source and switch to main mode. Consequently, the digital display device consumes less than one watt of power in the standby power mode.

24 Claims, 6 Drawing Sheets

STANDBY CIRCUIT FOR DIGITAL DISPLAY MONITOR

CROSS REFERENCE TO RELATED APPLICATION

This Application is a Continuation-in-Part of co-pending, commonly-owned U.S. patent application Ser. No. 09/658,657, filed Sep. 8, 2000, by T. Kawata, and entitled "System and Method for Reduced Standby Power Consumption in a Display Device."

BACKGROUND OF THE INVENTION

1. Field of the Invention

The present invention relates to the design of power supply circuits for electrical and electronic equipment. More specifically, the present invention pertains to the reduction of power consumption in a digital display device in standby mode.

2. Related Art

With the increasingly widespread use of computer systems in business and education and at home, it is important to conserve energy by reducing the power consumption of the display devices used with computer systems. Many display devices today provide a mechanism by which the appliance enters a "standby mode" after a period of inactivity, wherein the device remains "on" even though it is not currently being used. While in the standby mode, the device consumes less power than it does while in active use under normal operating conditions (the "main mode"). When activity resumes, the device exits its standby mode and reenters its main mode, and power consumption increases to the normal level. As such, power is conserved in standby mode, and the requisite power level for main mode operation is promptly restored upon the resumption of active use.

Recent regulations, such as those in Europe, stipulate that the power consumption of display devices in standby mode is to be less than one (1) watt (W), instead of the conventional three (3) watts. This and other similar regulatory changes, as well as the desire to conserve power, call for the industry to develop new circuits for implementing a standby mode in display devices that can meet current and pending power consumption requirements.

Several prior art circuits have been developed that use the synchronization (sync) signal(s) that are sent from the computer to the display device, such as the horizontal sync (h-sync) signal and vertical sync (v-sync) signal, as the trigger to switch between main mode and standby mode. In the display device art, it is known that when both the h-sync (horizontal) and v-sync (vertical) signals are present, either separately or in combination, the display device should be in main mode; that when only the v-sync signal is present, the display device should be in suspend mode; and that when only the h-sync signal is present, the display device should be in standby mode. Thus, a sync detect circuit can be used in conjunction with a microprocessor to monitor the sync signal(s) and control the voltage supplied to the monitor accordingly, thereby controlling the power it consumes.

Prior Art FIG. 1 illustrates one prior art circuit 100 wherein two power supplies are used to implement switching between main mode and standby mode. More particularly, prior art circuit 100 has an alternating current (AC) power input 101 and two separate power supplies 110 and 120, wherein AC input 101 is coupled to a main power supply 110 and a standby power supply 120 in parallel. Additionally, a microprocessor 130 is coupled between main power supply 110 and standby power supply 120. Furthermore, a sync detect circuit 140 is coupled between standby power supply 120 and microprocessor 130. Sync detect circuit 140 is also coupled to a computer 199.

In this prior art circuit 100, when the display device is operating in main mode, main power supply 110 provides power to the display device and other circuit elements (e.g., microprocessor 130 and sync detect circuit 140) via outputs 111, 112, 113 and 114. Typical values for these outputs of main power supply 110 are: +200 volts for output 111, +80 volts for output 112, +16 volts for output 113, and −16 volts for output 114. With these exemplary values, outputs 111 and 112 are typically coupled to the display device, and outputs 113 and 114 are typically coupled to the horizontal and vertical differentials (h-diff and v-diff) of the display device. In the same circuit 100, when the display device is in standby mode and is inactive, standby power supply 120 provides power to microprocessor 130 via output 123 (e.g., 5 volts or 3.3 volts) and to sync detect circuit 140 via output 124 (e.g., 5 volts or 3.3 volts).

Still referring to Prior Art FIG. 1, sync detect circuit 140 serves as a buffer between computer 199 and microprocessor 130. When sync detect circuit 140 no longer detects a sync signal 194 from computer 199, sync detect circuit 140 sends a "no_sync" signal 143 to microprocessor 130, which in turn sends an "off" signal 131 to main power supply 110. In response to off signal 131, main power supply 110 is turned off and the display device enters standby mode.

Note that standby power supply 120 remains on while the display device is in standby mode, in order to power microprocessor 130 and sync detect circuit 140. In other words, standby power supply 120 is always on irrespective of whether the display device is in main mode or standby mode. As such, sync detect circuit 140 continues to monitor for sync signal 194 from computer 199 while the display device is in standby mode. Upon detecting the resumption of signal 194 from computer 199, sync detect circuit 140 sends a "sync" signal 143 to microprocessor 130, which in turn sends an "on" signal 131 to main power supply 110. In response, main power supply 110 is turned on again and the display device thus resumes its main mode of operation.

One major disadvantage of prior art circuit 100 of FIG. 1 is that standby power supply 120 remains on even when the display device is in standby mode. The constant presence of an active power supply in circuit 100 means that power loss due to the switching action of the power supply (switching loss) cannot be avoided. Consequently, it is difficult to achieve a low power consumption level using prior art circuit 100. For example, with AC input 101 at approximately 230 volts (typical for European appliances), and with the exemplary values described above with respect to outputs 123 and 124 (5 volts or 3.3 volts), prior art circuit 100 cannot consistently achieve a standby power consumption of 1 W or less, as is required by the new European standard. Furthermore, prior art circuit 100 is also expensive to implement because an extra power supply (namely, standby power supply 120) is always required in addition to main power supply 110.

FIG. 2 illustrates another prior art circuit 200 wherein a single power supply is used to implement switching between main mode and standby mode. More specifically, prior art circuit 200 has an AC power input 201 and a power supply 210, wherein AC input 201 is coupled to power supply 210 having four outputs 211, 212, 213 and 214. Typical values for these outputs of power supply 210 while the display device is in main mode are: +200 volts for output 211, +80 volts for output 212, +16 volts for output 213, and −16 volts for output 214.

Outputs 211 and 212 are typically coupled to the display device, and outputs 213 and 214 are typically coupled to the horizontal and vertical differentials (h-diff and v-diff) of the display device. Output 211 is also coupled to a voltage drop circuit 250, and output 213 is also coupled to a voltage regulator 260. Voltage regulator 260 is coupled to a microprocessor 230 via line 263, and to a sync detect circuit 240 via line 264. Thus, voltage regulator 260 is coupled between power supply 210 and microprocessor 230, as well as between power supply 210 and sync detect circuit 240. Sync detect circuit 240 is further coupled to microprocessor 230 and to a computer 299. Furthermore, microprocessor 230 is coupled to voltage drop circuit 250, which is in turn coupled to voltage regulator 260.

Referring to both Prior Art FIGS. 1 and 2, it is noted that prior art circuit 200 differs from prior art circuit 100 in that it utilizes a single power supply (namely, power supply 210) to provide power to the display device and other circuit elements (e.g., microprocessor 230 and sync detect circuit 240), irrespective of whether the display device is operating in main mode or standby mode. In other words, there is no separate power supply (e.g., standby power supply 120) for powering the microprocessor 230 and sync detect circuit 240, as is the case in prior art circuit 100. In particular, in prior art circuit 200, power is provided to microprocessor 230 and sync detect circuit 240 through voltage regulator 260.

Referring to Prior Art FIG. 2, sync detect circuit 240 serves as a buffer between computer 299 and microprocessor 230. While the display device is operating in main mode, voltage drop circuit 250 is off and voltage regulator 260 is powered by output 213 of power supply 210 at about +16 volts. When sync detect circuit 240 ceases to detect a sync signal 294 from computer 299, sync detect circuit 240 sends a "no_sync" signal 243 to microprocessor 230, which in turn sends an "on" signal 235 to voltage drop circuit 250. In response, voltage drop circuit 250 is turned on. As a result, the voltage at output 211 of power supply 210 drops from about +200 volts to about +12 volts, whereas the voltage at output 213 of power supply 210 drops from about +16 volts to essentially zero volts. At this time, the display device enters standby mode, wherein power supply 210 remains on but delivers reduced outputs due to the action of voltage drop circuit 250.

In standby mode, voltage regulator 260 no longer derives power via output 213 but instead via voltage drop circuit 250 over line 256. As such, voltage regulator 260 continues to furnish power to microprocessor 230 and to sync detect circuit 249, which continues to monitor for sync signal 294 from computer 299 while the display device is in standby mode. Upon detecting the resumption of signal 294 from computer 299, sync detect circuit 240 sends a "sync" signal 243 to microprocessor 230, which in turn sends an "off" signal 235 to voltage drop circuit 250. In response, voltage drop circuit 250 is turned off again and the display device thus resumes its main mode of operation.

Like prior art circuit 100, one major disadvantage of prior art circuit 200 of FIG. 2 is the constant presence of an active power supply in circuit 200 (namely, power supply 210) means that power loss due to the switching action of the power supply (switching loss) cannot be avoided. Consequently, it is difficult to achieve a low power consumption level using prior art circuit 200. For instance, with AC input 201 at approximately 230 volts (typical for European appliances), and with the exemplary voltage of +12 volts delivered at output 211, prior art circuit 200 cannot consistently achieve a standby power consumption of 1 W or less, as is required by the new European standard. Furthermore, prior art circuit 200 is still relatively expensive to build because voltage drop circuit 250 and voltage regulator 260 are required for its implementation.

The design of a power mode switching circuit that can accomplish these objectives is complicated by the introduction of so-called digital display devices or monitors. In a digital display device, digital signals are used instead of analog signals for the red/green/blue (R/G/B) input signal and for the h-sync and v-sync signals. As described above, prior art circuits 100 and 200 (FIGS. 1 and 2, respectively) rely on the detection of analog signals such as the sync signals in order to know when to switch between main mode and standby mode. Consequently, prior art circuits such as circuits 100 and 200 will not function with a digital monitor, and these types of circuits cannot be used to switch a digital display device between the main and standby power modes.

In the main power mode, a digital display device is supplied by the computer system with an input voltage that is separate from the device's primary power source. This input voltage is typically equal to five volts, and is not supplied when the computer system and the display device are in standby (or active off) mode. However, as in the analog devices discussed above, the digital display device still needs to maintain an active power supply in standby mode in order to monitor when the device should be switched from standby mode to main mode. Consequently, power consumption in the standby mode cannot be consistently maintained below 1 W, and thus the European standard is also problematic for digital display devices. Accordingly, what is needed is a circuit for power mode switching which consistently consumes less than 1 W power in standby mode and which can be used with digital monitors.

In implementing a viable circuit for power mode switching in a digital display device, the cost of realizing the circuit is also an important consideration. It is desirable to avoid costly expenditures for retrofitting existing computer systems and/or digital display devices with a circuit design that can reduce power consumption in accordance with the European standard.

SUMMARY OF THE INVENTION

Thus, a need exists for a system and method for power mode switching which consistently consumes less than 1 W power in standby mode. A further need exists for a system and method which meets the above need and which can be built at relatively low cost. Still another need exists for a system and method which can meet the above needs and which is conducive to use with digital display devices and/or other appliances with digital input signals.

The present invention pertains to a system and method for power mode switching in which power consumed in the standby power mode is consistently less than 1 W. The present invention further provides a system and method which is relatively inexpensive to build. Moreover, the present invention provides a system and method conducive to use with digital devices that use digital input signals. In one embodiment, the present invention is implemented with a digital display device, such as a digital monitor used in a computer system.

In the present embodiment, in addition to the power provided by the primary power source, the digital device receives a voltage from a secondary power source in main power mode. The voltages from the primary and secondary power sources are not received in standby power mode. In one embodiment, the primary power source supplies an alternating current substantially equal to 230 volts, and the secondary power source supplies five volts (in main power mode).

In accordance with the present invention, a circuit is coupled to the secondary power source for detecting the voltage from the secondary power source. In the present embodiment, the circuit includes an opto-coupler operable to detect a voltage from the secondary power source, and a transistor coupled to the opto-coupler. The use of these types of components makes the circuit of the present invention relatively inexpensive to build.

The transistor generates a first digital signal when the voltage is detected by the opto-coupler and a second digital signal when the voltage is not detected. An integrated circuit is coupled to the transistor. In response to the first digital signal, the integrated circuit is powered on and turns on the power supply for the digital device. In response to the second digital signal, the integrated circuit is powered off and turns off the power supply for the digital device.

Thus, in accordance with the present embodiment of the present invention, the power supply is turned on or off responsive to the opto-coupler. Accordingly, the digital device is switched between main power mode and standby power mode responsive to the opto-coupler.

As a result, in accordance with the present invention, it is not necessary for components of the digital device to remain powered on to detect the secondary power source in order to switch the device between power modes. Consequently, the digital device consumes less than 1 W of power in the standby power mode. These and other advantages of the present invention not specifically mentioned above will become clear within discussions of the present invention presented herein.

BRIEF DESCRIPTION OF THE DRAWINGS

Prior Art

Prior Art

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations. These descriptions and representations are the means used by those skilled in the art to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated.

Unless specifically stated otherwise as apparent from the following discussions, it is appreciated that throughout the present invention, discussions utilizing terms such as "detecting," "powering on," "powering off," "switching," or the like, refer to actions and processes (e.g., process 500 of FIG. 5) of an electronic device, such as a computer system or a display device coupled to the computer system.

Figure 1:
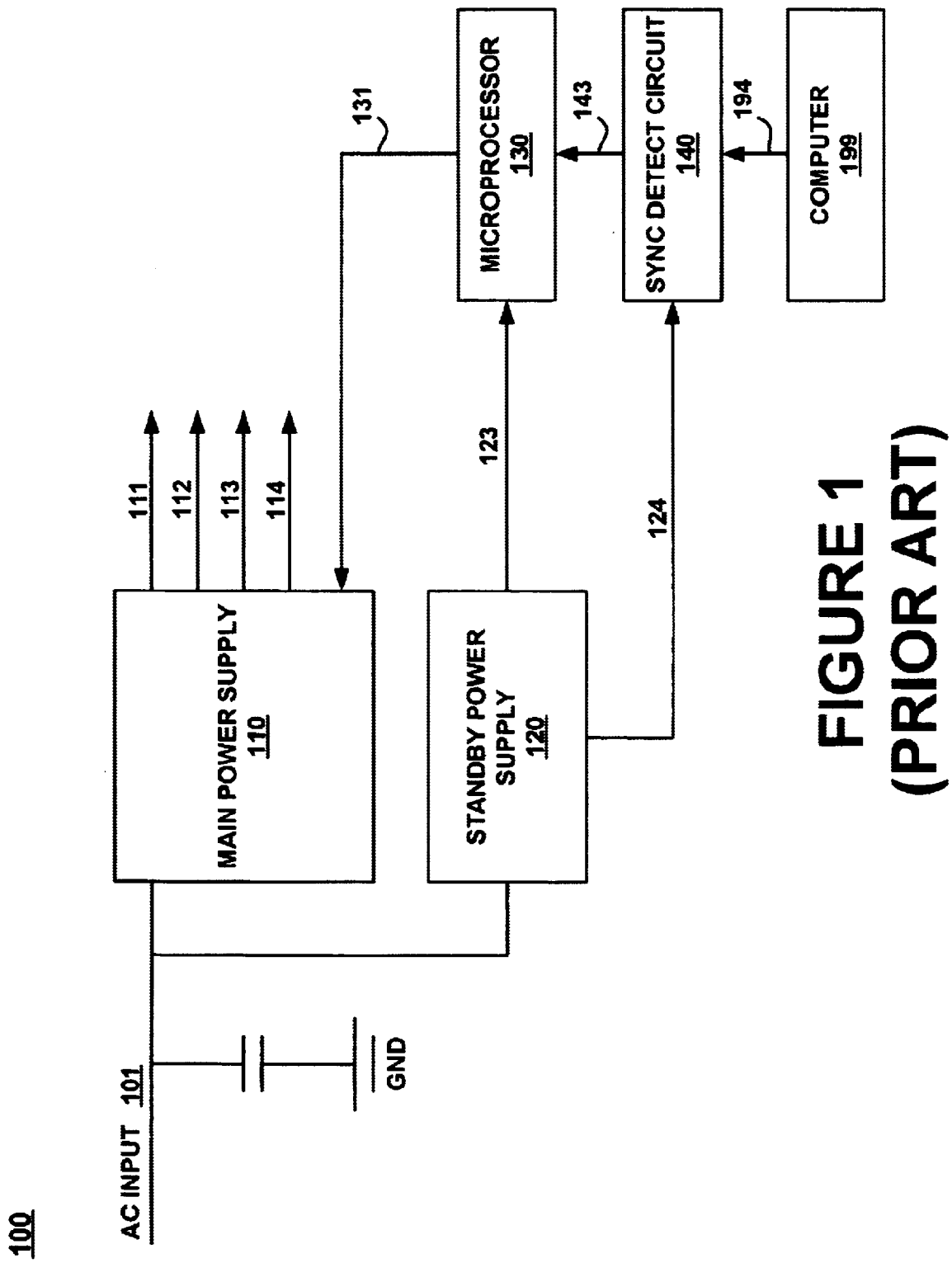
FIG. 1 illustrates a prior art circuit wherein two power supplies are used to implement switching between main mode and standby mode.
Figure 2:
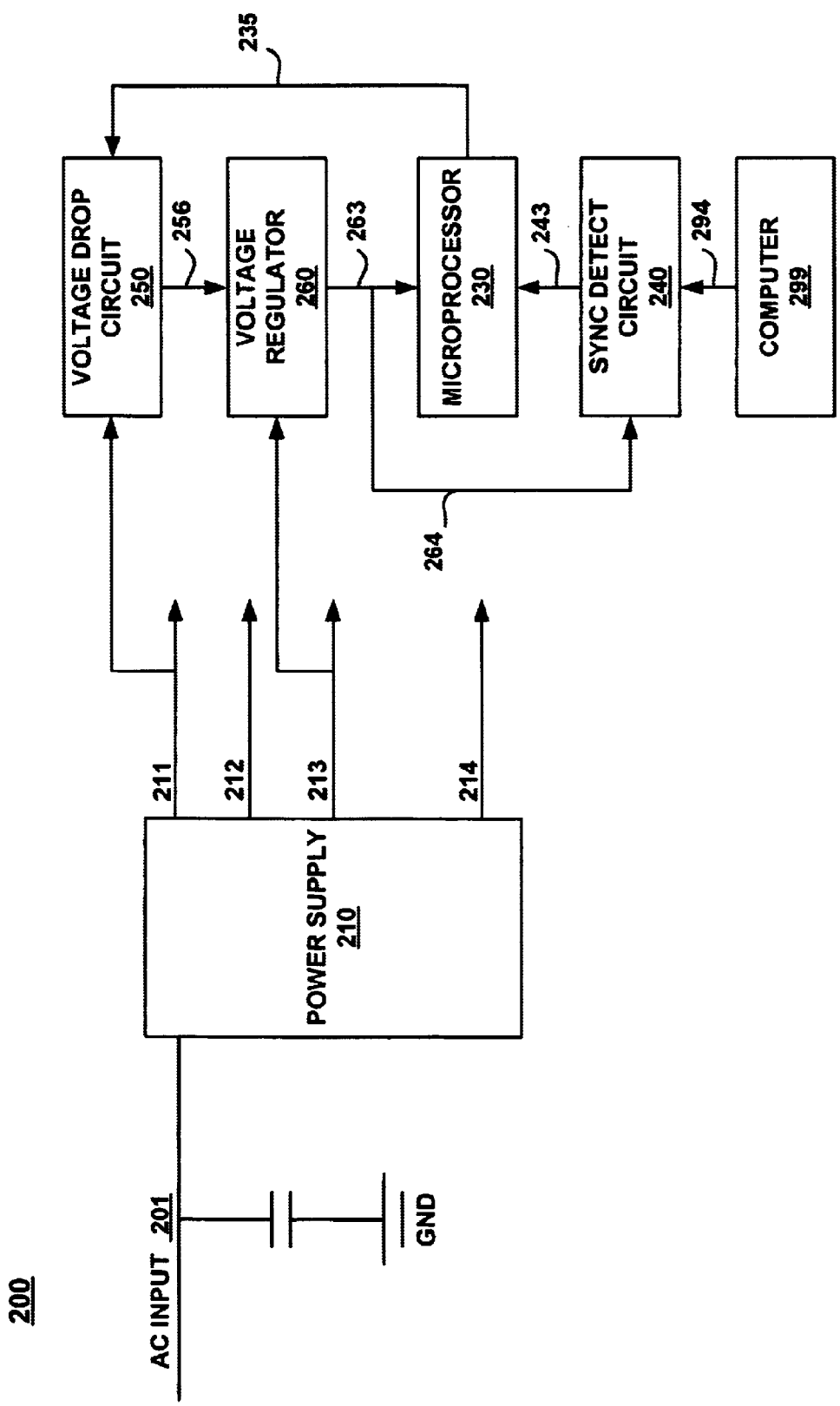
FIG. 2 illustrates another prior art circuit wherein a single power supply is used to implement switching between main mode and standby mode.
Figure 3:
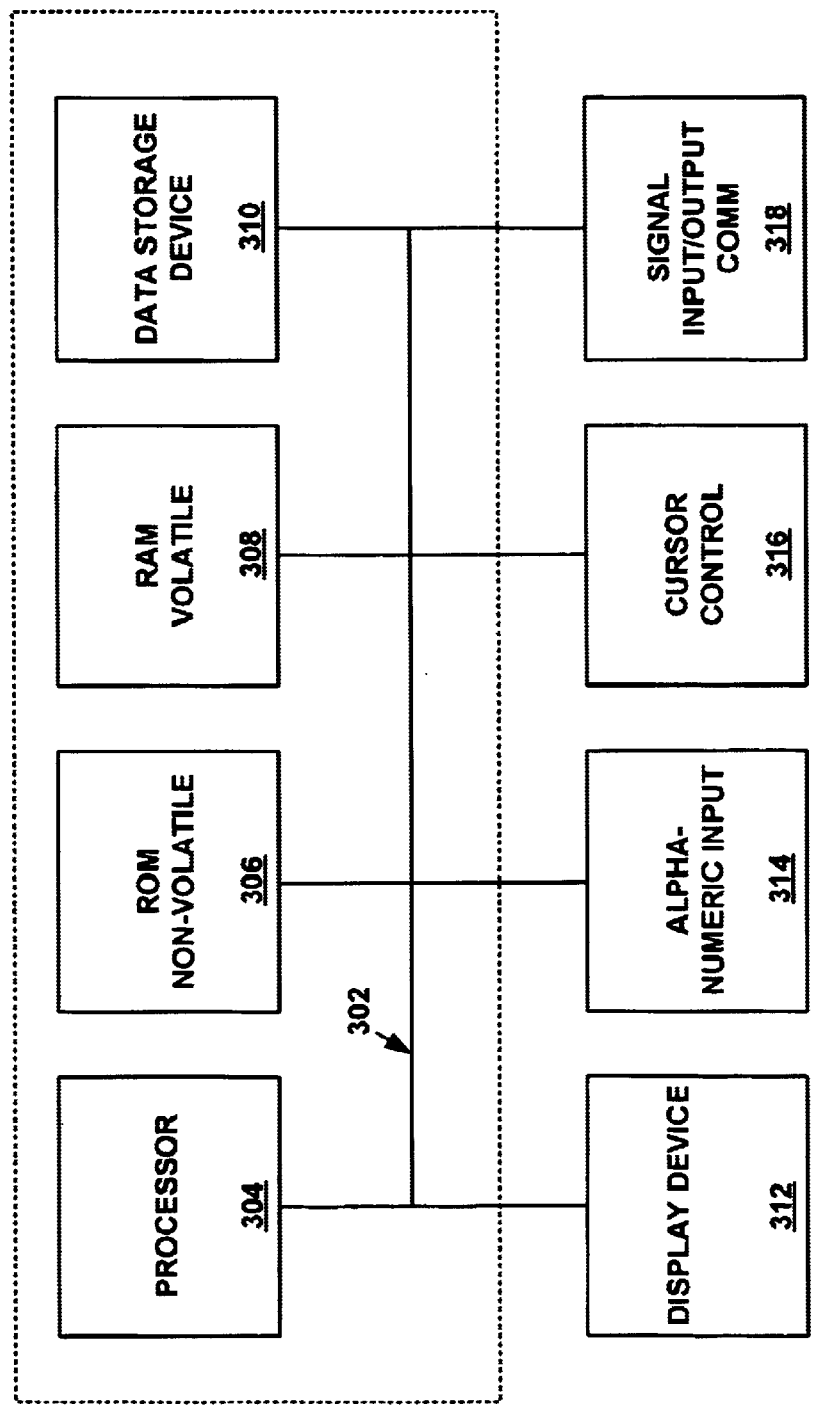
FIG. 3 is a block diagram of an exemplary general purpose computer system upon which embodiments of the present invention can be implemented.

Although a variety of different computer systems can be used with the present invention, an exemplary general purpose computer system 399 is shown in FIG. 3. In general, computer system 399 includes an address/data bus 302 for communicating information and a central processor 304 coupled with bus 302 for processing information and instructions. Memory units of computer system 399 include a non-volatile memory 306 (e.g., read only memory, ROM) coupled with bus 302 for storing static information and Instructions for processor 304, a volatile memory 308 (e.g., random access memory, RAM) coupled with bus 302 for storing information and instructions for central processor 304, and a data storage device 310 such as a magnetic or optical disk and disk drive coupled with bus 302 for storing information and instructions. Data storage device 310 can include one or more removable magnetic or optical storage media (e.g., diskettes, tapes) which are computer readable memories.

A digital display device 312 is also coupled to bus 302 for displaying information to the computer user. Digital display device 312 may be a liquid crystal device, other flat panel display, cathode ray tube, or other display device suitable for creating graphic images and alphanumeric characters recognizable to the user. Digital display device 312 uses digital input signals (instead of analog signals) for the red/green/blue (RIG/B) input signal and for the horizontal and vertical synchronization (sync) signals.

In accordance with the present invention, digital display device 312 is capable of switching between a main power mode and a standby power mode (also known as an active off mode). Digital display device 312 receives a five (5) volt (V) input signal when operating in the main power mode; this input signal is not received when in the standby power mode. Additional information is provided in conjunction with FIG. 4A and FIG. 5, below.

Also included in computer system 399 of FIG. 3 is an optional alphanumeric input device 314 including alphanumeric and function keys coupled to bus 302 for communicating information and command selections to central processor 304. Computer system 399 also includes an optional cursor control or directing device 316 coupled to bus 302 for communicating user input information and command selections to central processor 304. Cursor control device 316 allows the computer user to dynamically signal the two dimensional movement of a visible symbol (cursor) on a display screen of display device 312. Many implementations of cursor control device 316 are known in the art including a trackball, mouse, touch pad, joystick or special keys on alphanumeric input device 314 capable of signaling movement of a given direction or manner of displacement. Alternatively, it will be appreciated that a cursor can be directed and/or activated via input from alphanumeric input device 314 using special keys and key sequence commands or by other means such as, for example, voice commands. Computer system 399 can also include an optional signal input/output communication device 312 (e.g., modem, network interface card, etc.) coupled to bus 302 for interfacing with other computer systems.

It is appreciated that computer system 399 described herein illustrates an exemplary configuration of a general purpose computer system with which embodiments of the present invention can be implemented. Nevertheless, other computer systems with differing configurations and other types of display devices can also be used in place of computer system 399 within the scope of the present invention.

Figure 4A:
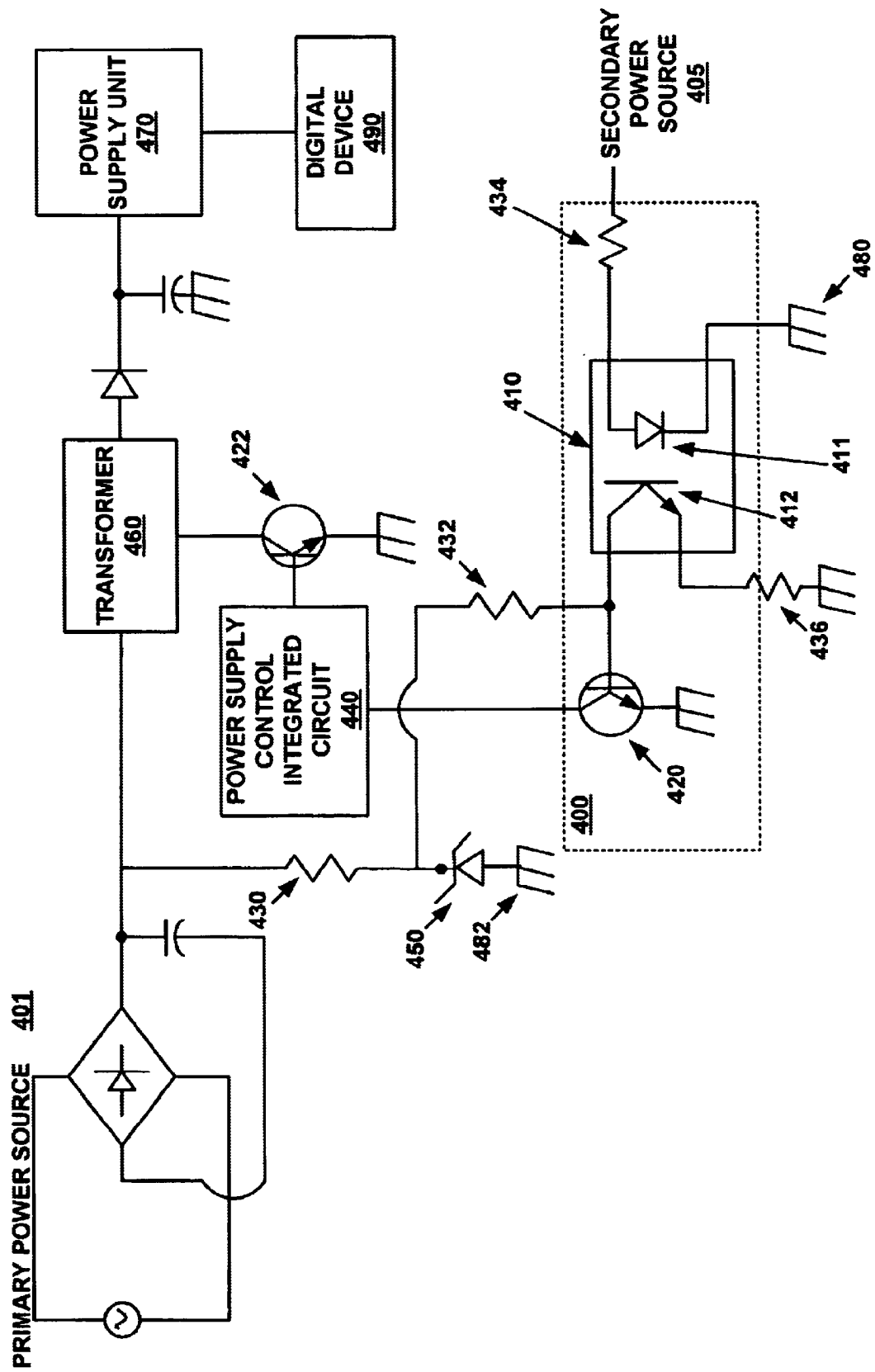
FIG. 4A illustrates one embodiment of a circuit for power mode switching in a digital device in accordance with the present invention.

FIG. 4A is an illustration of a circuit 400 used with a digital device 490 for power mode switching between a main power mode and a standby power mode (or active off mode) in accordance with one embodiment of the present invention. In the present embodiment, digital device 490 is a digital display device (monitor) such as digital display device 312 of FIG. 3; however, it is appreciated that circuit 400 can be used with other types of digital devices.

Figure 4B:
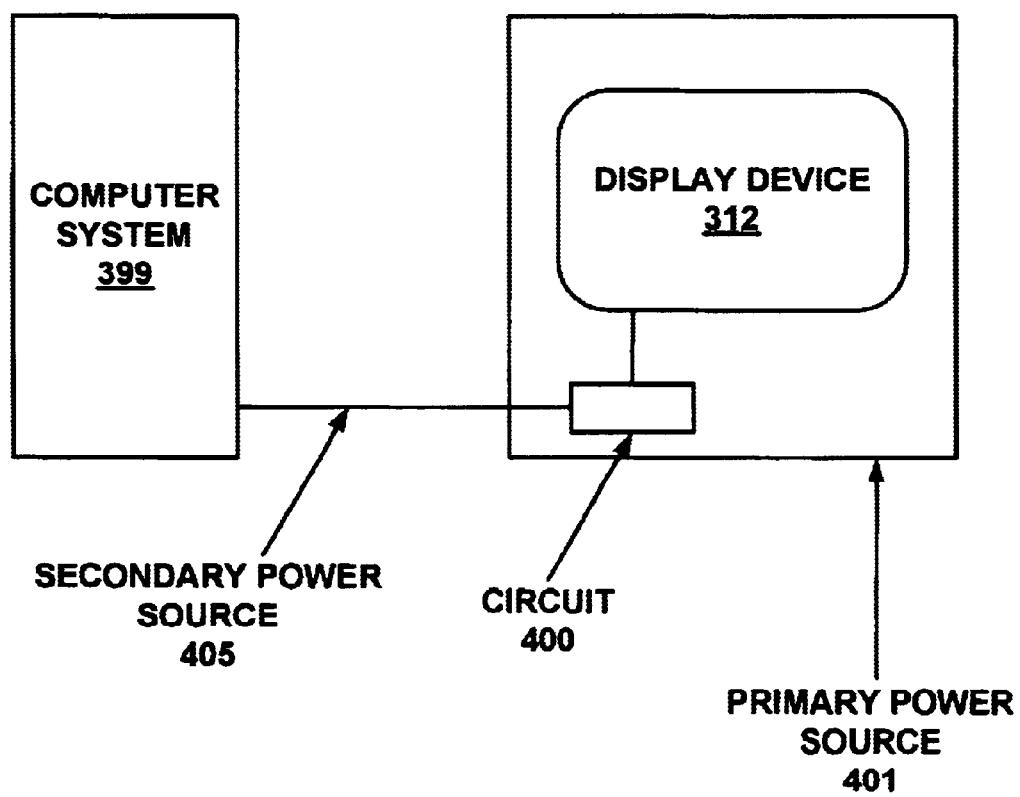
FIG. 4B is a block diagram illustrating the circuit of FIG. 4A implemented in a digital display device in accordance with one embodiment of the present invention.

FIG. 4B is a block diagram illustrating an exemplary implementation of circuit 400 with a display device 312 in accordance with one embodiment of the present invention. In its essence, circuit 400 is coupled between computer system 399 and display device 312. Therefore, although circuit 400 and display device 312 are shown as being integrated in a single unit, it is appreciated that circuit 400 can be externally as Well as internally coupled to display device 312, and as such can be retrofitted to legacy devices. It is further appreciated that display device 312 can include other components not shown.

Returning to FIG. 4A, in the present embodiment, circuit 400 includes an opto-coupler 410. Opto-coupler 410 comprises a light-emitting diode (LED) 411 and a phototransistor 412 mounted in proximity to each other in an opaque package. When current flows through LED 411 in the forward direction, LED 411 lights up, thereby causing phototransistor 412 to conduct.

In the present embodiment, the anode (positive terminal) of LED 411 is coupled to a secondary power supply 405, and the cathode (negative terminal) is coupled to the secondary side ground 480. In this embodiment, a first resistor 434 is coupled between the anode of LED 411 of opto-coupler 410 and secondary power supply 405.

Secondary power source 405 supplies a voltage to circuit 400 when the digital device is operating in the main power mode; this voltage is not supplied when the digital device is operating in the standby power mode. In one embodiment, secondary power source 405 is provided by a computer system (such as computer system 399 of FIG. 3). In one embodiment, secondary power source 405 supplies 5 V to circuit 400.

With reference still to FIG. 4A, in the present embodiment, circuit 400 also includes a first transistor 420 coupled to the collector terminal of phototransistor 412 of opto-coupler 410. In this embodiment, the emitter terminal of phototransistor 412 is coupled to ground. In one embodiment, a second resistor 436 is coupled between the emitter terminal of phototransistor 412 and ground.

In the present embodiment, in addition to secondary power source 405, circuit 400 is coupled to a primary power source 401, which provides power to digital device 490 in the main power mode. In the present embodiment, primary power source 401 is coupled to the collector terminal of phototransistor 412 of opto-coupler 410. Accordingly, a collector voltage can be applied to phototransistor 412 so that it is in its active region. In this embodiment, a third resistor 430 and a fourth resistor 432 are coupled between primary power source 401 and phototransistor 412. In one embodiment, primary power source 401 is coupled to the primary side ground 482 via a zener diode 450.

In the present embodiment, circuit 400 (specifically, first transistor 420) is also coupled to integrated circuit 440. In this embodiment, integrated circuit 440 controls the power supply to digital device 490. In the present embodiment, primary power source 401 and integrated circuit 440 are coupled via a second transistor 422 and a transformer 460. Primary power source 401 is also coupled to a power supply unit 470 for digital device 490 via transformer 460. In one embodiment, primary power source 401 supplies an alternating current substantially equivalent to 230 volts.

Figure 5:
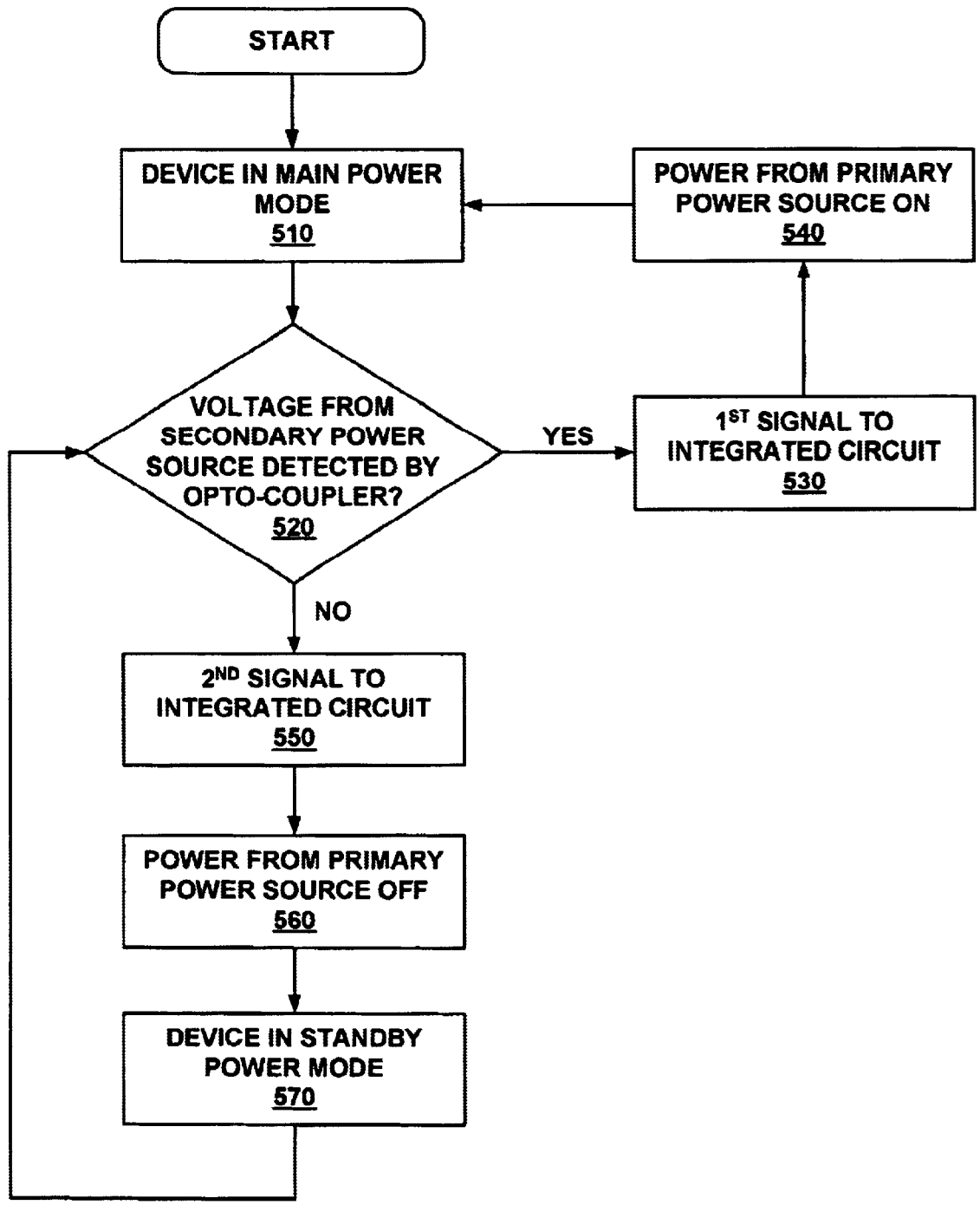
FIG. 5 is a flowchart of the steps in a process for switching a device between a main mode and a standby mode in accordance with one embodiment of the present invention.

FIG. 5 is a flowchart of the steps in a process 500 for switching a digital device 490 (e.g., display device 312 of FIG. 3) between a main power mode and a standby power mode using circuit 400 (FIG. 4A) in accordance with one embodiment of the present invention.

In step 510 of FIG. 5, with reference also to FIG. 4A, digital device 490 is operating in the main power mode. As such, power is being supplied to digital device 490 by primary power source 401. Additionally, in the main power mode, secondary power source 405 supplies a voltage to circuit 400. In one embodiment, primary power source 401 supplies an alternating current at approximately 230 volts, and secondary power source 405 supplies approximately 5 volts.

In step 520 of FIG. 5, again with reference also to FIG. 4A, in accordance with the present embodiment of the present invention, opto-coupler 410 of circuit 400 either detects or does not detect a voltage from secondary power source 405. In the present embodiment, LED 411 of opto-coupler 410 is selectively turned on and off depending on whether a voltage is being supplied by secondary power source 405. When opto-coupler 410 (specifically, LED 411) detects voltage from secondary power source 405, LED 411 lights up and causes phototransistor 412 to conduct. Without a voltage from secondary power source 405, LED 411 is not lit up and therefore phototransistor 412 will not conduct. Thus, opto-coupler 410 can detect whether or not a voltage is being supplied by secondary power source 405.

As described above, in the main power mode, secondary power source 405 supplies a voltage to circuit 400, and in the standby power mode, secondary power source 405 does not provide a voltage to circuit 400. Accordingly, opto-coupler 410 can be used to determine whether digital device 490 should be in the main power mode or in the standby power mode.

In one embodiment, secondary power source 405 is provided by computer system 399; in this embodiment, digital device 490 is display device 312 coupled to computer system 399 (see FIGS. 3 and 4B). When computer system 399 is operating in its main power mode, voltage (e.g., from secondary power source 405) is provided to circuit 400. Correspondingly, display device 312 should be in main power mode. When computer system 399 enters its standby (sleep) mode, voltage (e.g., from secondary power source 405) is not provided to circuit 400. Correspondingly, display device 312 should be in standby power mode. Alternatively, after a predetermined period of time, computer system 399 may stop supplying voltage to circuit 400 in order to put display device 312 in standby power mode; that is, computer system 399 may remain in main power mode while placing display device 312 in standby power mode.

With reference again to FIGS. 4A and 5, when opto-coupler 410 detects voltage from secondary power source 405, process 500 proceeds to step 530; when opto-coupler 410 does not detect voltage from secondary power source 405, process 500 proceeds to step 550.

In step 530 of FIG. 5, with reference to FIG. 4A also, when the voltage from secondary power source 405 is detected, opto-coupler 410 sends a signal to transistor 420. In response, transistor 420 sends a signal having a first value (e.g., "high") to integrated circuit 440.

In step 540, again with reference to FIGS. 4A and 5, upon receiving the high signal from transistor 420, integrated circuit 440 is powered on. In response to integrated circuit 440, primary power source 401 will supply power to digital device 490 in the main power mode.

In step 550 of FIG. 5, with reference also to FIG. 4A, when the voltage from secondary power source 405 is not detected (step 520), opto-coupler 410 does not send a signal to transistor 420. Alternatively, when the voltage from secondary power source 405 is halted, opto-coupler 410 can send the equivalent of an "off" signal to transistor 420. In response, transistor 420 sends a signal having a second value (e.g., "low") to integrated circuit 440.

In step 560, with reference still to FIGS. 4A and 5, upon receiving the low signal from transistor 420, integrated circuit 440 is powered off. In response to integrated circuit 440, primary power source 401 stops supplying power to digital device 490, and thus digital device 490 enters the standby power mode (step 570). Display device 490 remains in the standby power mode until voltage from secondary power source 405 is subsequently received and detected by opto-coupler 410 in accordance with the present invention.

In the standby power mode, in accordance with the present invention, power is no longer supplied to the components of display device 490, thereby reducing power consumption. For example, because opto-coupler 410 is used to detect a voltage from secondary power source 405, and hence can be used to determine when display device 490 should switch to main power mode from standby power mode, it is not necessary for integrated circuit 440 to be powered on in order to perform this function. Therefore, circuit 400 of the present invention advantageously avoids powering integrated circuit 440 and other components of the digital device 490 during standby power mode, and also avoids switching losses. The power consumption of digital device 490 in standby power mode is thus minimized. For example, with primary power supply 401 at approximately 230 volts, circuit 400 of the present invention consistently achieves a standby power consumption of less than 1 W, which is in full compliance with the European standard.

In addition, with reference back to FIG. 4A, opto-coupler 410 monitors secondary power source 405 (instead of analog signals such as the sync signals), and opto-coupler 410 controls power to digital device 490 via signals to integrated circuit 440. As such, circuit 400 of the present invention can be used with digital devices (e.g., digital device 490), including digital display devices.

Furthermore, circuit 400 of the present invention is inexpensive to build because the circuit elements required for its implementation, including opto-coupler 410 and first transistor 420, are inexpensive. Moreover, it is appreciated that circuit 400 of the present invention does not require specialized circuit components or extensive retrofitting of existing computer systems and/or display devices, because the circuit elements required for its implementation are compatible with contemporary electronic appliances, including existing computer systems, as well as digital devices including digital display devices. In summary, a system and method for power mode switching in a digital display device, which consistently achieves less than 1 W power dissipation in standby mode, and which is inexpensive to build is thus furnished by the present invention.

The preferred embodiment of the present invention, standby circuit for digital display monitor, is thus described. While the present invention has been described in particular embodiments, it should be appreciated that the present invention should not be construed as limited by such embodiments, but rather construed according to the below claims.

What is claimed is:

1. A circuit for switching a device between a main power mode and a standby power mode, said circuit comprising:
    an opto-coupler coupled to a secondary power source, wherein said opto-coupler is operable to detect a voltage from said secondary power source; and
    an integrated circuit coupled to said opto-coupler, wherein said integrated circuit is powered on in response to said opto-coupler detecting said voltage from said secondary power source, and wherein said integrated circuit is powered off in response to said opto-coupler not detecting said voltage;
    wherein detecting said voltage by said opto-coupler causes said device to be placed in said main power mode, and wherein not detecting said voltage by said opto-coupler causes said device to be placed in said standby power mode, wherein said device is coupled to a primary power source, wherein said primary power source supplies an alternating current substantially equivalent to 230 volts and wherein said circuit consumes power at a rate of less than one watt while said device is in said standby power mode.

2. The circuit of claim 1 wherein said device comprises a display device.

3. The circuit of claim 2 wherein said voltage from said secondary power source is supplied by a computer system coupled to said display device.

4. The circuit of claim 1 wherein said voltage from said secondary power source is substantially equal to five volts.

5. The circuit of claim 1 comprising:
    a first transistor coupled between said opto-coupler and said integrated circuit, wherein said first transistor provides a digital input signal to said integrated circuit, wherein said digital input signal has a first value when said voltage from said secondary power source is detected by said opto-coupler and a second value when said voltage is not detected.

6. The circuit of claim 1 comprising:
a first resistor coupled between an anode of a light emitting diode (LED) of said opto-coupler and said secondary power source.

7. The circuit of claim 1 comprising:
a second resistor coupled between an emitter terminal of a phototransistor of said opto-coupler and ground.

8. The circuit of claim 1 comprising:
a zener diode coupled between a collector terminal of a phototransistor of said opto-coupler and ground; and
a third resistor coupled between said zener diode and said primary power source.

9. The circuit of claim 8 further comprising:
a fourth resistor coupled between said collector terminal and said third resistor.

10. A method of switching a device between a main power mode and a standby power mode, said method comprising the steps of:
a) detecting at an opto-coupler a voltage supplied by a secondary power source;
b) powering on an integrated circuit coupled to said opto-coupler provided said voltage is detected by said opto-coupler, wherein said device is placed in said main power mode; and
c) powering off said integrated circuit provided said voltage is not detected by said opto-coupler, wherein said device is placed in said standby power mode, wherein said device is coupled to a primary power source, wherein said primary power source supplies an alternating current substantially equivalent to 230 volts and wherein said circuit consumes power at a rate of less than one watt while said device is in said standby power mode.

11. The method of claim 10 wherein said device comprises a display device.

12. The method of claim 11 wherein said voltage from said secondary power source is supplied by a computer system coupled to said display device.

13. The method of claim 10 wherein said voltage from said secondary power source is substantially equal to five volts.

14. The method of claim 10 wherein said step b) comprises the steps of:
b1) generating a first signal at a transistor when said voltage is detected by said opto-coupler, wherein said integrated circuit is powered on in response to said first signal; and
b2) powering said device from said primary power source under control of said integrated circuit.

15. The method of claim 10 wherein said step c) comprises the steps of:
c1) generating a second signal at a transistor when said voltage is not detected by said opto-coupler, wherein said integrated circuit is powered off in response to said second signal; and
b2) powering off said primary power source under control of said integrated circuit.

16. A digital display device operable in a main power mode and a standby power mode, said digital display device comprising:
a secondary power source;
a circuit coupled to said secondary power source, said circuit comprising:
an opto-coupler operable to detect a voltage from said secondary power source; and
a first transistor coupled to said opto-coupler, said first transistor operable to generate a first digital signal when said voltage is detected by said opto-coupler and a second digital signal when said voltage is not detected; and
an integrated circuit coupled to said first transistor, wherein responsive to said first digital signal said integrated circuit is powered on and wherein responsive to said second digital signal said integrated circuit is powered off;
wherein said digital display device is placed in said main power mode provided said integrated circuit is powered on and in said standby power mode provided said integrated circuit is powered off; and
wherein in said standby power mode said digital display device consumes less than one watt of power.

17. The digital display device of claim 16 wherein said digital display device is coupled to a computer system, and wherein said voltage from said secondary power source is supplied by said computer system.

18. The digital display device of claim 16 wherein said voltage is substantially equal to five volts.

19. The digital display device of claim 16 comprising:
a first resistor coupled between an anode of a light emitting diode (LED) of said opto-coupler and said secondary power source.

20. The digital display device of claim 16 comprising:
a second resistor coupled between an emitter terminal of a phototransistor of said opto-coupler and ground.

21. The digital display device of claim 16 comprising:
a primary power source coupled to said integrated circuit, wherein power from said primary power source is supplied to said digital display device in said main power mode and wherein power from said primary power source is not supplied in said standby power mode.

22. The digital display device of claim 20 wherein said primary power source supplies an alternating current substantially equivalent to 230 volts.

23. The digital display device of claim 21 further comprising:
a zener diode coupled between a collector terminal of a phototransistor of said opto-coupler and ground; and
a third resistor coupled between said zener diode and said primary power source.

24. The digital display device of claim 23 further comprising:
a fourth resistor coupled between said collector terminal and said third resistor.

* * * * *